INVENTORS
PIERRE H. PACAULT
PAUL COSAR
BY
Hopgood + Calimafde
ATTORNEYS

INVENTORS
PIERRE H. PACAULT
PAUL COSAR
BY Hopgood & Calimafde
ATTORNEYS

United States Patent Office 3,374,621
Patented Mar. 26, 1968

3,374,621
GAS TURBINE AUXILIARY FOR
STEAM POWER PLANTS
Pierre Henri Pacault, Ville d'Avray, and Paul Cosar, Paris, France, assignors to Societe Francaise des Constructions Babcock & Wilcox, Paris, France, a corporation of France
Filed Jan. 24, 1966, Ser. No. 522,589
Claims priority, application France, Jan. 26, 1965, 3,289
6 Claims. (Cl. 60—39.18)

ABSTRACT OF THE DISCLOSURE

The invention embodies means for more economically utilizing, in a steam power plant, the hot gas output of turbine auxiliaries. The hot exhaust of the auxiliary is used to heat feed water and to supply oxygen to the combustion chamber of the boiler. The use of one or two of such auxiliaries is described. As the exhaust gases of the auxiliary increase, the amount of steam required by the economizer and the in-take air heaters is increasingly diminished, freeing such steam for production of power.

Figure 1:
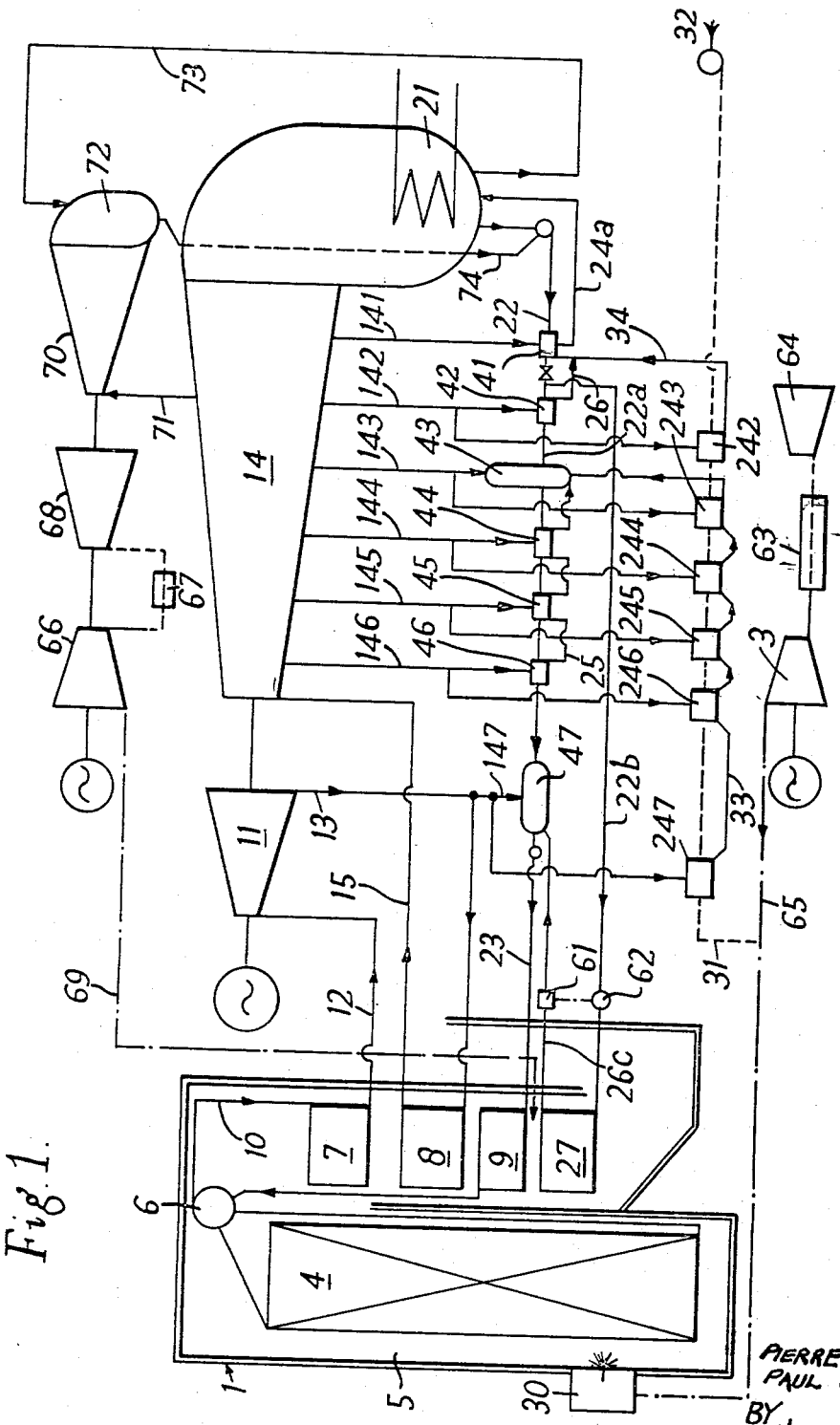

This invention relates to power plants comprising steam turbine means arranged to be supplied by a generating unit and having, for supplementing the plant power production, further power producing means operating with the production of exhaust gases.

The further power producing means may be gas turbine means. In a mixed power plant comprising steam turbine means and a gas turbine, the gas turbine may be quickly put into service when the power demanded exceeds that corresponding the maximum desired load on the steam turbine means and associated steam generating unit. The exhaust gases of the gas turbine have a relatively high temperature and heat in such gases is in principle capable of being used in the plant. Since in order to limit the temperature of the gases supplied to the turbine it is ensured that such gases have a large excess of air, a way of recovering heat from turbine exhaust gases is to use such gases to provide some or all of the oxygen required at the firing means of the steam generating unit. However, if more than a certain amount of gas turbine power is supplied, the output of turbine exhaust gases will be more than that required at the steam generating unit firing means and an excess of such gases should not be injected into the combustion chamber of the steam generating unit.

The present invention provides a power plant comprising steam turbine means arranged to be supplied by a fuel-fired generating unit and having, for supplementing the plant power production, further power producing means operating with the production of exhaust gases, wherein some of the further power producing means are arranged to deliver exhaust gases therefrom to heat, in pre-economizing heat exchange means of the steam generating unit, feedwater for the steam generating unit flowing in a feedwater flow path which is in parallel with a feedwater flow path through heat exchange means receiving as heating medium steam withdrawn from the steam turbine means and in which feedwater flow may be automatically controlled so as to regulate the feedwater temperature at the feedwater outlet from the said pre-economizing heat exchange means.

In a more particularly envisaged embodiment of the invention, the further power producing means comprise two gas turbines arranged to be supplied with gas from respective combustion chambers of which one gas turbine is arranged to deliver exhaust gases therefrom to supply at least part of the oxygen required at the firing means of the steam generating unit and the second gas turbine is provided for increasing supplementary power above that delivered by the first gas turbine when the latter supplies all the oxygen required at the firing means of the steam generating unit. Such a plant may advantageously have therein an auxiliary steam turbine arranged to operate with steam which is withdrawn from the main steam turbine means in order to prevent overloading of the main steam turbine means and the condenser means thereof when, as a consequence of supplementary power production with operation of the second gas turbine, the amount of steam withdrawn from the main steam turbine means for feedwater heating is reduced.

The further power producing means of the plant for supplementing power production by the steam turbine means and of which the exhaust gases are arranged to traverse pre-economizing heat exchange means of the steam generating unit may comprise a diesel engine or/ and a gas turbine operating on gases produced by combustion chambers of the aircraft jet engine type or on gases produced by a free piston hot pressure gas generator with or without post-combustion.

Figure 2:
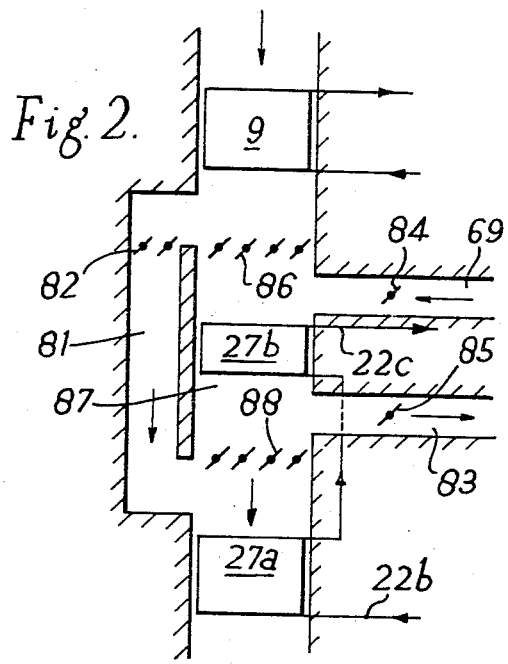
Figure 3:
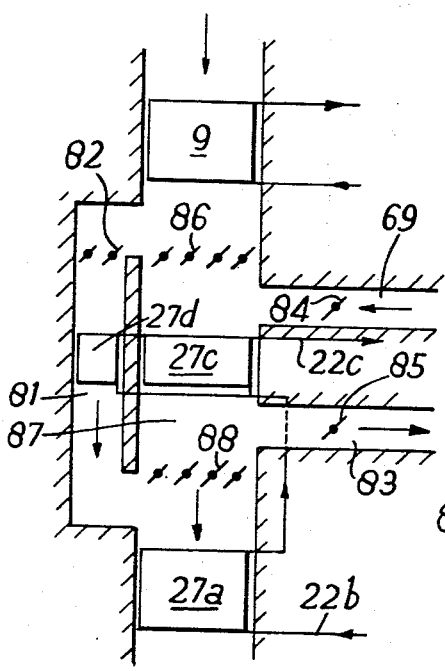
Figure 4:
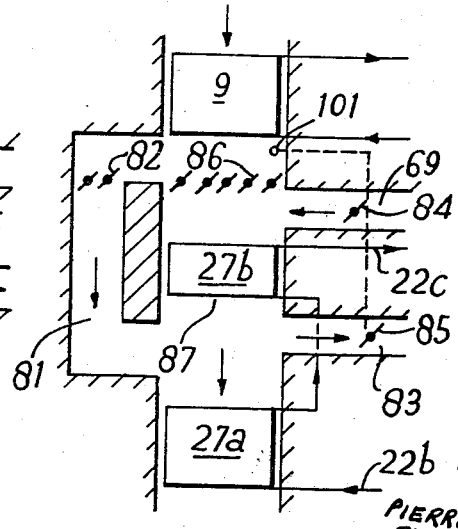

The invention will now be described by way of example with reference to the accompanying drawings in which FIGURE 1 represents schematically a steam turbine power plant with auxiliary gas turbine means and FIGURES 2 to 4 show schematically respective modifications of the power plant of FIGURE 1 as regards the dispositions of pre-economizing means in gas flow paths.

Referring to FIGURE 1 of the drawings, in a power plant a steam generating unit 1 is arranged to supply steam turbine means 11 and 14 with superheated and reheated steam and gas turbines 3 and 66 are provided for supplementing the power of the power plant.

The steam generating unit is of the kind with steam generating tubes 4 at the walls of a combustion chamber 5, arranged for the flow of water thereto under natural circulation from a steam and water drum 6 and for the flow of steam and water therefrom back to the drum, and with a steam superheater 7, a steam reheater 8 and an economizer 9 in the flow path of combustion gases from the combustion chamber. A steam pipe 10 leads steam from the drum 6 to the superheater 7. The steam turbine means 11 and 14 includes a high pressure turbine 11 which is connected, by a steam pipe 12, to receive superheated steam from the superheater 7 and to pass partly expanded and cooled steam by a steam pipe 13 to the reheater 8 and a low pressure turbine 14 connected by a steam pipe 15 to receive reheated steam from the reheater 8 and to pass its exhaust steam to a condenser 21. The condensate water from the condenser provides feedwater for the steam generating unit and is pumped through line 22 towards a water tank 47 and thence pumped through line 23 to the economizer 9 and thence to the drum 6.

The feedwater line 22 leads the water through a feedwater heater 41 and then divides into a branch 22a and a branch 22b, of which the branch 22a leads feedwater in succession through a plurality of feedwater heaters 42 to 46. The feedwater heaters 41 to 46 are heat exchangers operating with the condensation of steam withdrawn through respective bled steam lines 141 to 146 from respective stages, of progressively higher steam pressures and temperatures, of the low pressure turbine 14. A condensate path 25 leads from the heater 46 through the heater 45 and the heater 44 to the heater 43 which is constructed as a de-aerator and in which withdrawn steam from the line 143 condenses in the feedwater and another condensate path 26 leads from the heater 42 through the heater 41 to the condenser 21.

The feedwater line 22b leads feedwater to a pre-economizer 27 arranged in the flow path of steam generator combustion gases which have left the economizer 9 and thence through a line 26c to the water tank 47. Means 61 responsive to the feedwater temperature in the line 22c are arranged, by controlling a valve 62 in the line 22b, to maintain a constant temperature at the feedwater outlet from the pre-heater 27.

The tank 47 receives, through a bled steam line 147 leading from the steam pipe 13, steam withdrawn from the outlet of the high pressure turbine 11.

The combustion chamber 5 of the steam generating unit 1 has firing means 30 which normally receive all their combustion air through an air duct 31 from an air compressor 32. The duct 31 leads the combustion air in series through a plurality of combustion air heaters 242 to 247 which are heat exchangers operating with the condensation of steam withdrawn from steam turbine stages in the respective steam lines 142 to 147. A condensate path 33 leads from the combustion air heater 247 in succession through the air heaters 246, 245, 244 and 243 to the feedwater heater 43 and another condensate path 34 leads from the combustion air heater 242 to the feedwater heater 41.

The gas turbine 3 is arranged to be driven by the expansion of gases from a combustion chamber 63 of any suitable construction, which is arranged to receive combustion air from an air compressor 64 and fuel through means not shown. The exhaust gases from the gas turbine enter a gas duct 65 which leads into the air duct 31 behind, in the air flow path, the air heater 247 so that when the gas turbine is operated the gases therefrom flow along a length of the air duct leading to the firing means 30 together with combustion air that may be delivered by the compressor 32 and heated in the combustion air heaters.

The second gas turbine 66 provided for supplementing the power of the power plant is arranged to be driven by the expansion of gases from a combustion chamber 67 of any suitable construction, which is arranged to receive combustion air from an air compressor 68 and fuel through means not shown. The exhaust gases from the gas turbine 66 enter a gas duct 69 which discharges them into the flow path of the steam generator gases at a point in such path downstream of the economizer 9 and upstream of the pre-economizer 27.

An auxiliary low pressure steam turbine 70 is adapted to operate with steam withdrawn through a bled steam line 71, suitably controllable by means not shown, from an intermediate stage of the low pressure turbine 14. The condenser 72 of the turbine 70 is of the relatively simple injection type and uses for steam condensation purposes a stream of condensate water withdrawn through a line 73 from the condenser 21 of the low pressure turbine 14. The condensate from the condenser 72 of the auxiliary steam turbine 70 is pumped into the feedwater line 22.

In the operation of the power plant, assuming no supplementary power production by gas turbines, all the combustion air for the firing means 30 of the steam generating unit is supplied by the compressor 32 delivering the air through the air heaters 242 to 247. The steam generating unit generates, superheats and reheats steam which is expanded and cooled in driving the high pressure and low pressure steam turbines 11 and 14; the auxiliary turbine 70 is not used. Most of the steam passes through all of the said steam turbine means and is condensed in the condenser 21 while some steam leaves steam turbine stages for regenerative feedwater heating in the heat exchangers 41 to 46 and tank 47. Some of the feedwater may be heated in the pre-economizer 27 instead of in the feedwater heaters 41 to 46. The fuel and the combustion air for the steam-generating unit are varied as required to meet the load within the normal range of steam turbine powers.

When it is required to supplement the power production, the gas turbine 3 and air compressor 64 are started and the combustion chamber 63 is fired with an air excess sufficient to limit sufficiently the gas temperature at the gas turbine 3. Together with air which is heated in the combustion air heaters 242 to 247 the mixture of gaseous combustion products and heated air leaving the gas turbine 3 passes to the firing means 30 of the steam generating unit. Thus said mixture supplies additional heat to the steam generating unit and the heat in said mixture that is lost to the power plant is limited to that rejected at the steam generating unit gas outlet.

The heat contributed by the gas turbine exhaust gas mixture to the combustion chamber 5 of the steam generating unit makes it useful to provide the pre-economizer 27 to abstract heat from the gases subsequent to the economizer 9. The amount of heat abstracted from those gases increases with the amount of heat in said gases by virtue of the operation of the temperature regulating means 61, 62.

The use of the pre-economizer 27 reduces the amount of feedwater sent through the feedwater heaters 42 to 46 and therefore reduces the amount of steam bled from turbine stages in the withdrawn steam lines 142 to 146 and thus increases steam turbine power.

Since the exhaust gases from the gas turbine 3 contain a large proportion of heated air, less air is required to be passed by the compressor 32 through the combustion air heaters 242 to 247. The reduction in the duty required by the air heaters 242 to 247 reduces the amount of steam bled from turbine stages in the withdraw steam lines 142 to 147 and thus increases steam turbine power.

As the power production is increased by increasing the gas turbine power, a stage is reached at which the full amount of oxygen required for the fuel consumption in the steam generating unit comes from the gas turbine exhaust. When it is desired to operate in a higher power range by further increasing gas turbine power, the second gas turbine 66 and air compressor 68 are started and the combustion chamber 67 is fired with an air excess sufficient to limit sufficiently the gas temperature at the inlet to the gas turbine 66. The exhaust gases from the second gas turbine 66, led by the gas duct 69 to a point in the gas flow path from the combustion chamber 5 which is prior to the pre-economizer 27, makes further heat available to be absorbed by feedwater passing through the said pre-economizer. Corresponding to the increase in the flow of feedwater through the pre-economizer 27 necessary to absorb extra heat there is a further reduction in the feedwater flow through the feedwater heaters 42 to 46 and therefore a further reduction in the amounts of steam bled from turbine stages in the withdrawn steam lines 142 to 146.

Since the low pressure steam turbine 14 and the condenser 21 may be such as otherwise to be overloaded when there is a reduction or too great a reduction in the steam bled from the turbine through the steam lines 142 to 146 when the plant power is supplemented by gas turbine power or by more than a certain amount of gas turbine power, a suitable amount of steam is withdrawn from the said turbine through the line 71 to prevent such overloading and is used to drive the auxiliary low pressure steam turbine 70. As shown, the auxiliary steam turbine 70 is on the same shaft as the second gas turbine 66 and the compressor 68 and it is used when the second gas turbine is in operation. The auxiliary steam turbine 70 might alternatively, however, be arranged independently of the second gas turbine 66 and it might in this case be arranged to be brought into use when the first gas turbine 3 is in operation and it might in this case be arranged to drive the compressor 64 associated therewith.

The upper power range gained by an increase in gas turbine power beyond that at which the exhaust gases from the gas turbine 3 provide the full amount of air required for the fuel consumption in the steam generating unit 1 does not involve reducing the steam generating unit efficiency by sending further turbine exhaust gases into the combustion chamber 5.

The plant may be designed for base load operation with steam turbine power production only, higher powers being gained by bringing one or both gas turbines into operation. Alternatively, the base load may be met by steam turbine power production supplemented by power production by the first gas turbine 3, higher power being gained by bringing the second gas turbine 66 into operation.

FIGURE 2 refers to a modification of the arrangement of FIGURE 1 in which exhaust gases from the second gas turbine 66 may be led over a section of the pre-economizer without being added to the combustion gases from the combustion chamber 5 of the steam generator 1. According to this modification, the pre-economizer comprises a section 27a supplied with feedwater through the line 22b and a section 27b which can be traversed by steam generator combustion gases in passage from the economizer 9 to the pre-economizer section 27a and which receives feedwater through a connecting line from the pre-economizer 27a and which passes heated feedwater to the line 22c. A gas passage 81 is provided which, when dampers 82 are open, enables steam generator combustion gases to flow from a position in the gas flow path behind the economizer 9 to a position in the gas flow path in front of the pre-economizer section 27a, by-passing the pre-economizer section 27b. The gas duct 69 is arranged to lead exhaust gases from the second gas turbine 66 to a position in the gas path in front of the pre-economizer section 27b. An outlet turbine gas duct 83 is provided for withdrawing turbine gases from a position behind the pre-economizer section 27b. Dampers 84 and 85 are provided in the respective turbine gas ducts 69 and 83, dampers 86 are provided for controlling the entry of steam generator combustion gases into the gas passage 87 in which the pre-economizer section 27b lies and into which the turbine exhaust gas ducts 69 and 83 connect and dampers 88 are provided for controlling the outlet of turbine exhaust gases from said gas passage 87.

When steam turbine power but no gas turbine power is produced, the dampers 82, 84 and 85 are closed and the dampers 86 and 88 are open; the steam generator combustion gases therefore pass in series through the pre-economizer sections 27b and 27a. When gas turbine power is produced in addition to steam turbine power and the gas turbine 66 operates, the dampers 86 and 88 are closed and the dampers 82, 84 and 85 are open; the steam generator combustion gases therefore flow through the by-pass gas passage 81 and over the pre-economizer section 27a while the gases from the second gas turbine 66 flow from the gas duct 69 over the pre-economizer section 27b and leave through the outlet turbine gas duct 83.

Since the turbine exhaust gases are not, in this arrangement, added to the steam generator combustion gases the duct collectors or grit arrestors through which it is necessary to pass the latter gases if the combustion chamber 5 is fired by pulverized fuel are not overloaded by the passage therethrough in addition to the said gases of turbine exhaust gases which if arising from liquid or gaseous fuel firing may not require to be passed through duct collectors or grit arrestors. Moreover, since no heat exchanger traversed by steam generator combustion gases receives also turbine exhaust gases when the second gas turbine is used the draught loss in the former gas stream is not increased when the second gas turbine is used, on the contrary, the draught loss in the steam generator combustion gas stream may be reduced. As shown in and described in connection with FIGURE 1 and for the same purpose a valve 62 (not shown in FIGURE 2) may be provided in the feedwater line 22b and controlled by temperature responsive means 61 (not shown in FIGURE 2) in the feedwater line 22c.

The gas temperature downstream of the pre-economizer section 27a may be approximately the same whether the steam generator combustion gases flow through the passage 87 or the passage 81.

FIGURE 3 refers to a modification differing from the modification shown in FIGURE 2 in that it has, instead of a single pre-economizer section 27b subsequent in the feedwater flow path to the pre-economizer section 27a, both a pre-economizer section 27c in the gas passage 87 and a pre-economizer section 27d in the gas passage 81. Feedwater connections are provided so that feedwater from the pre-economizer section 27a may flow to the outlet line 22c in parallel through the pre-economizer sections 27c and 27d when turbine exhaust gases and steam generator combustion gases flow in the respective gas passages 87 and 81; the pre-economizer 27d ensures a better heat recovery from the latter gases. The various dampers are put in open or closed positions for the circumstances of operation in the manner described in connection with FIGURE 2. When steam generator combustion gases flow through the gas passage 87 and the dampers 82 are closed, feedwater flow through the pre-economizer 27d in the gas passage 81 is interrupted by means not shown.

The arrangements shown in FIGURES 2 and 3 may be modified by placing the pre-economizer section 27a in the boiler gas flow path behind the economizer 9 and ahead of the dampers 82 and 86 and arranging that the feedwater flows from the line 22b first into the pre-economizer section 27b or into the pre-economizer section 27c or in parallel into the pre-economizer section 27c and 27d and then through the pre-economizer section 27a into the outlet line 22c.

FIGURE 4 refers to a modification differing from the modification of FIGURE 2 in that the dampers 88 are omitted so that, when turbine exhaust gases flow through the gas passage 87, a proportion thereof may join the steam generator combustion gases in flowing through the pre-economizer 27a, said proportion being varied by automatic adjustment of the degree of opening of the dampers 85 in dependence upon any suitable means 101 responsive to gas pressure at the gas outlet from the economizer 9 to regulate said pressure. It will be understood that this modification is more appropriate to the case when steam generator combustion gases and turbine exhaust gases do not require to be passed through grit arrestors or dust collectors before being discharged.

What we claim is:

1. A power plant comprising:
   steam turbine means;
   fuel-fired steam generating means connected to and driving said steam turbine means and having firing means;
   a gas passage means venting said firing means;
   pre-economizer means disposed within said gas passage means;
   a feedwater system connected to and feeding said pre-economizer means;
   feedwater heaters;
   means connecting said heaters to said turbine means whereby said heaters are operated by steam bled from said turbine means;
   gas turbine means;
   a duct leading from the exhaust of said gas turbine means to said gas passage means for discharging therein gas from said exhaust at a point upstream of said pre-economizer means in the direction of flow of said gas passage means;
   an air compressor connected to and supplying air for said gas turbine means;
   and an auxiliary steam turbine connected to and driving said air compressor, said auxiliary steam turbine connected to and operating on steam bled from said steam turbine means.

2. A power plant as claimed in claim 1 wherein said auxiliary steam turbine has a condenser of the injection type operating on condensate water from the main turbine means.

3. A power plant comprising:
steam turbine means;
fuel-fired steam generating means connected to and driving said steam turbine means and having firing means;
a gas passage means venting said firing means;
pre-economizer means disposed within said gas passage means;
a feedwater system connected to and feeding said pre-economizer means;
feedwater heaters;
means connecting said heaters to said steam turbine means whereby said heaters are operated by steam bled from said steam turbine means;
gas turbine means;
a duct leading from the exhaust of said gas turbine means to said gas passage means discharging therein the gas turbine exhaust at a point upstream of said pre-economizer means in the direction of flow of said gas passage means;
said gas passage means including a damper-controlled portion and a by-pass duct for bypassing said portion; said damper-controlled portion containing a section of said pre-economizing means, and having an inlet duct and an outlet duct placed respectively upstream and downstream of said pre-economizer section and arranged respectively for the delivery and withdrawal of gas supplied by said gas turbine means.

4. A power plant as claimed in claim 3, further having a pre-economizer section placed outside said damper-controlled portion.

5. A power plant as claimed in claim 3, further having a pre-economizer section placed outside said damper-controlled portion and a pre-economizer section contained within said by-pass duct.

6. A power plant as claimed in claim 3, wherein said outlet duct has a damper-control means responsive to the gas pressure prevailing in said gas passage means upstream of said damper-controlled portion to control the flow of gas turbine exhaust through said damper-controlled portion.

References Cited

UNITED STATES PATENTS

| 2,235,541 | 3/1941 | Warren | 60—67 X |
| 2,848,983 | 8/1958 | Lieberherr | 122—479 |
| 2,921,441 | 1/1960 | Buri | 122—1 X |
| 3,032,999 | 5/1962 | Pecault | 122—1 X |
| 3,304,712 | 2/1967 | Pacault et al. | 60—39.18 |

FOREIGN PATENTS

| 482,684 | 4/1938 | Great Britain. |
| 575,935 | 3/1946 | Great Britain. |
| 834,784 | 5/1960 | Great Britain. |

CARLTON R. CROYLE, *Primary Examiner.*